Patented Oct. 26, 1926.

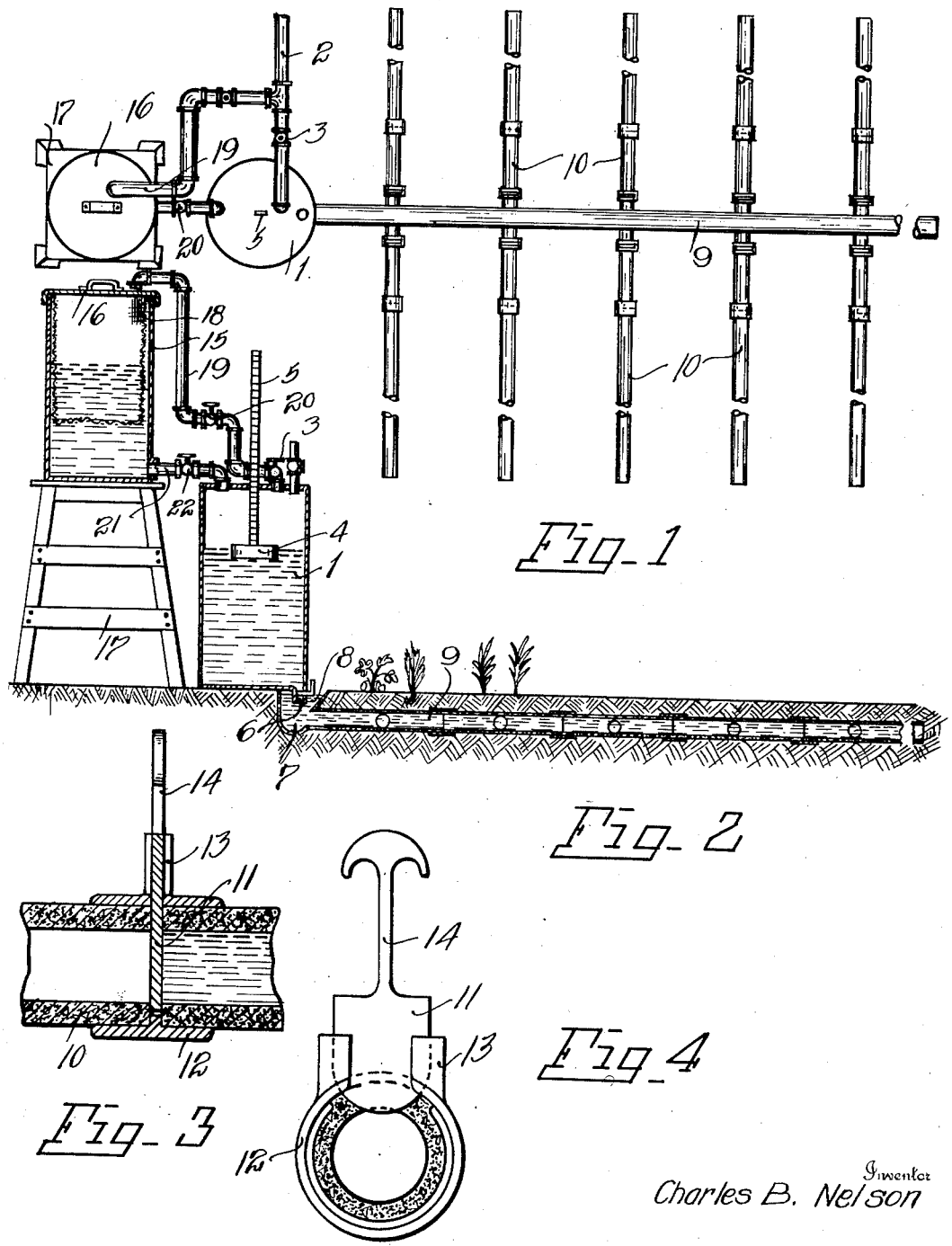

1,604,189

UNITED STATES PATENT OFFICE.

CHARLES B. NELSON, OF TEKOA, WASHINGTON.

SUBIRRIGATION SYSTEM.

Application filed June 26, 1925. Serial No. 39,737.

My present invention relates to improvements in subirrigation systems or means and methods for applying water and also a liquid fertilizer to the soil beneath its surface. As is well known in the art of plant husbandry and in hydraulic and earth engineering, the application of irrigating and cultivating mediums to the surface of the soil does not attain the best and most efficient results in supplying the roots of plant life with the necessary agencies for propagation. By the utilization of the apparatus and system of my invention, the water, and when desired a fertilizer in liquid solution, may be uniformly distributed in the subsoil and regulated with facility as to quantity of water and proportions of fertilizer.

My invention consists in certain novel combinations and arrangements of supply tanks, distributing pipes, and regulating devices in the system of irrigation, as will hereinafter be more specifically set forth and claimed.

In the accompanying drawings I have illustrated one complete example of the physical embodiment of my invention wherein the parts are combined and arranged in accordance with the best mode I have thus far devised for the practical application of the principles of my invention.

Figure 1 is a top plan view showing the installation of a unit of the irrigation system according to my invention.

Figure 2 is a vertical sectional view through the fertilizer and water tanks and also through the main distributing pipe, with other parts of the apparatus illustrated.

Figure 3 is a detail longitudinal sectional view showing one of the vertically slidable water gates, in closed position in one of the lateral pipes.

Figure 4 is a transverse sectional view in one of the branch pipes or laterals, with the water gate or valve in open position.

In carrying out my invention the irrigating system may be used in a single unit or in a multiple of units depending upon the size of the project involved in the irrigating process, and while I have shown in the drawings but a single unit it will be understood that the size of this unit may be varied and that the number of units may be varied in use.

In the preferred form of my invention each unit has a water tank as 1 of suitable dimensions and proportions which is usually supported on the ground level as indicated in Figure 2. This tank may be a metallic cylinder or composed of other material in desirable shape, and is provided with a supply pipe 2 leading from a suitable source of supply to the closed top of the tank. A supply valve 3 is present in the supply pipe for regulating or cutting off the supply of water to the water tank, and a float 4 and indicator stem 5 projecting through a packed joint in the top of the tank are used to indicate the water level in the tank.

The water tank is equipped with an outlet nozzle 6 which projects below the bottom of the tank and into a basin 7 that is located below the surface of the ground level, and preferably closed. A vent may be provided at 8 in the basin to permit passage of air therefrom and from the main pipe 9 and laterals 10 when the supply of water to the subsoil pipes is initiated, but the vent is closed before the water reaches a level from which it would escape through the vent opening.

The main pipe 9 is connected directly to the basin 7 and extends, beneath the surface of the soil to be irrigated, to a suitable distance from the tank. The laterals, 10 which are preferably made up of porous material that will permit slow seepage or passage of the water through the walls of these lateral pipes, extend at an angle, here shown as a right angle, from the main pipe at both its sides. The laterals or laterally extending distributing branch pipes are spaced apart at suitable intervals in order that the desired area of sub-soil may be irrigated, and they are placed at the required depth which may vary depending upon the character of the soil and the nature of the plants to be irrigated.

The distribution of water in the several laterals may be controlled by the use of a number of water gates or valves 11, one for each lateral, giving an independent control for each lateral.

The water gates are of the vertically slidable type and are disposed transversely of the distributing pipes and located at a joint between pipe-sections. A casing 12 is arranged at the pipe joint and guides 13 are provided for the valve 11 which is in the form of a flat blade and provided with a handle 14 for correct manipulation. The valve or gate is shown closed in Figure 3 and open in Figure 4 and the operation of the gate will be apparent from an inspection of these views of the drawing.

In addition to the supply of water for irrigation I also supply a liquid fertilizer when desirable which is mixed with the water and flows with it through the porous distributing pipes for promoting the growth of the plants by enriching the sub-soil or enhancing the value of the soil.

For the fertilizer I employ a tank 15 which may be similar to the water tank and is gravity actuated in its feed, but preferably elevated above the level of the water tank. A removable lid 16 is provided for the fertilizer tank, and a stand or supporting frame 17 is used beneath the tank as indicated in Figure 2. Within the fertilizer tank a removable cage 18 made up of suitable material and preferably reticulated is supported. This cage may be removed, after having first withdrawn the lid 16, and loaded or charged with a fertilizer in granular or other form suitable for dissolution in water within the fertilizer tank, and the charged or loaded cage is then placed in the tank as indicated in Figure 2. The cage may be removed from time to time and replaced with a fresh charge or load of fertilizer material.

Water is supplied to the fertilizer tank through a water pipe 19 connected with the main supply pipe 2 and the supply of water to the fertilizer tank is controlled by the regulating valve 20 in the pipe 19.

The liquid solution of fertilizer passes from the fertilizer tank to the water tank 1 through an outlet pipe 21 and a valve 22 in this pipe is used to regulate the supply of liquid fertilizer to the water tank. When the fertilizer is not required the valve 22 is closed and water alone from the water tank may be used for irrigating the sub-soil, and it will be apparent that the soil may be both fertilized and irrigated when the valve 22 is opened for introduction of liquid fertilizer to the water tank.

Having thus fully described my invention what I claim as new and desire to secure by Letters Patent is—

In an irrigating apparatus, the combination with a water tank having a supply pipe and having a sub-irrigation system connected thereto, of a fertilizer tank adjacent said water tank and supported in elevated position above the water tank, a branch supply pipe leading to the top of said fertilizer tank, a removable container in said fertilizer tank for fertilizing material, an outlet pipe from said fertilizer tank and connected to the top of said water tank, and means in said water tank for indicating the liquid content thereof.

In testimony whereof I affix my signature.

CHARLES B. NELSON.